(12) United States Patent
Nakatomi et al.

(10) Patent No.: US 7,668,799 B2
(45) Date of Patent: Feb. 23, 2010

(54) INFORMATION PROCESSING APPARATUS

(75) Inventors: Masashi Nakatomi, Tokyo (JP); Eiji Kemmochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 11/507,737

(22) Filed: Aug. 22, 2006

(65) Prior Publication Data

US 2007/0050325 A1  Mar. 1, 2007

(30) Foreign Application Priority Data

Aug. 23, 2005 (JP) ............................. 2005-241101
Aug. 3, 2006 (JP) ............................. 2006-212357

(51) Int. Cl.
*G06F 17/30* (2006.01)
(52) U.S. Cl. ............................. 707/1; 707/2
(58) Field of Classification Search ................. 707/1–3
See application file for complete search history.

(56) References Cited

U.S. PATENT DOCUMENTS

| | | | | |
|---|---|---|---|---|
| 6,721,729 B2* | 4/2004 | Nguyen et al. | ................. | 707/3 |
| 7,085,755 B2* | 8/2006 | Bluhm et al. | ................. | 707/3 |
| 7,392,234 B2* | 6/2008 | Shaath et al. | ................. | 707/1 |
| 2004/0220898 A1* | 11/2004 | Eguchi et al. | ................. | 707/1 |
| 2005/0210009 A1* | 9/2005 | Tran | ............................. | 707/3 |
| 2007/0022098 A1* | 1/2007 | Malik | ............................ | 707/3 |

FOREIGN PATENT DOCUMENTS

| | | |
|---|---|---|
| JP | 7-306847 | 11/1995 |
| JP | 8-101766 | 4/1996 |
| JP | 2000-259658 | 9/2000 |
| JP | 2002-288208 | 10/2002 |
| JP | 2003-114903 | 4/2003 |
| JP | 2003-522993 | 7/2003 |
| JP | 2004-220152 | 8/2004 |
| JP | 2004-533193 | 10/2004 |
| JP | 2005-504399 | 2/2005 |
| JP | 2005-505070 | 2/2005 |

\* cited by examiner

*Primary Examiner*—Mohammad Ali
*Assistant Examiner*—Huawen Peng
(74) *Attorney, Agent, or Firm*—Cooper & Durham, LLP

(57) ABSTRACT

An information processing apparatus includes a storing unit configured to store a past history storing table for storing information indicating operations performed on one or more electronic files.

22 Claims, 17 Drawing Sheets

| ELECTRONIC FILE ID | ELECTRONIC FILE INFORMATION | | | | | |
|---|---|---|---|---|---|---|
| | EXTENSION | ELECTRONIC FILE NAME | FOLDER LOCATION | ELECTRONIC FILE SIZE | CREATION DATE AND TIME | ... |
| 1 | doc | MINUTE BOOK A | A/document/ | 566KB | 2004/1/5 | ... |
| 2 | txt | REPORT B | A/document/ | 299KB | 2004/1/5 | ... |
| 3 | jpg | PHOTO 1 | B/pictures/ | 300KB | 2003/5/6 | ... |
| 4 | txt | CONFERENCE NOTE C | C/document/ | 40KB | 2004/2/3 | ... |
| ... | ... | ... | ... | ... | ... | ... |

FIG.4

| ELECTRONIC FILE ID | DESCRIPTION OF OPERATION |
|---|---|
| 1 | PRINTER A, A4, ONE SHEET, DUPLEX PRINTING |
| 2 | EDIT WITH APPLICATION B |
| 3 | MAIL TO abc@ricoh.co.jp |
| 4 | TRANSFER TO SERVER C |
| ... | ... |

FIG.5

| EXTENSION | ELECTRONIC FILE NAME | FOLDER LOCATION | ELECTRONIC FILE SIZE | CREATION DATA AND TIME | ... |
|---|---|---|---|---|---|
| 0.1 | 0.3 | 0.5 | 0.0 | 0.1 | ... |

FIG.6

| ELECTRONIC FILE ID | EXTENSION | ELECTRONIC FILE INFORMATION | | | | |
|---|---|---|---|---|---|---|
| | | ELECTRONIC FILE NAME | FOLDER LOCATION | ELECTRONIC FILE SIZE | CREATION DATE AND TIME | ... |
| 1 | doc | MINUTE BOOK A | A/document/ | 566KB | 2004/1/5 | ... |
| 2 | txt | REPORT B | A/document/ | 299KB | 2004/1/5 | ... |
| 3 | jpg | PHOTO 1 | B/pictures/ | 300KB | 2003/5/6 | ... |
| 4 | txt | CONFERENCE NOTE C | C/document/ | 40KB | 2004/2/3 | ... |
| ... | ... | ... | ... | ... | ... | ... |

FIG.13

| NAME | DIVISION | DEVICE NAME | DEGREE OF EXPERIENCE | NETWORK ADDRESS | ... |
|---|---|---|---|---|---|
| Ricoh Taro | SALES DIVISION 1 | COMPUTER 1 | 10 | 192.168.1.4 | ... |

FIG.14

$$\frac{\begin{pmatrix} P_{1,1} \\ P_{2,1} \\ \vdots \\ P_{l,1} \end{pmatrix} \odot \begin{pmatrix} P_{1,2} \\ P_{2,2} \\ \vdots \\ P_{l,2} \end{pmatrix}}{\left\| \begin{pmatrix} P_{1,1} \\ P_{2,1} \\ \vdots \\ P_{l,1} \end{pmatrix} \right\| \odot \left\| \begin{pmatrix} P_{1,2} \\ P_{2,2} \\ \vdots \\ P_{l,2} \end{pmatrix} \right\|}$$

FIG.15

| NAME | DIVISION | DEVICE NAME | DEGREE OF EXPERIENCE | NETWORK ADDRESS | FOLDER LOCATION | ... |
|---|---|---|---|---|---|---|
| Ricoh Taro | SALES DIVISION 1 | COMPUTER 1 | 10 | 192.168.1.4 | C/profile/Ricoh Taro/ | ... |

INFORMATION PROCESSING APPARATUS

BACKGROUND OF THE INVENTION

1. Technical Field

This disclosure generally relates to an information processing apparatus and especially to an information processing apparatus for suggesting operations of a user performed on an electronic file.

2. Description of the Related Art

There are various types of operations that can be performed on electronic files stored in a computer.

Such operations on electronic files include direct operations on electronic files such as copying, transfer, deletion, and the like, operations performed on applications such as transmission of an attachment to an electronic mail message, printing using an application, and the like, operations on electronic files performed by applications such as editing using a document editor, compression for reducing a file size, and the like.

Description of operations performed on electronic files also involve various conditions such as a transfer destination of an electronic file, a transmission destination of a file-attached electronic mail message, the number of printing of an electronic file, and the like.

Because of such a diversity of operations, computers have many functions of which users are unaware. For example, when it is possible to directly transmit electronic files in a computer via facsimile transmission, users unaware of such a function print a document on paper and then transmit the printed document via a facsimile, so that only a printing function is used on the computer.

Such a possibility that users do not recognize functions in this manner is increased in proportion as new functions are added and functions are more complicated. In view of this, the following methods have been frequently employed in order to suggest functions to users so as to make effective use of the computer.

One method is referred to as "Office Assistant". Office applications such as word processing software, spreadsheet software, and the like, display functions which might be useful for users in a certain situation in a text message form.

The other method displays a window message for suggesting application functions as "useful functions" when starting an application.

However, these methods have the following problems.

Firstly, whether suggestion is suitable for a specific situation is uncertain. In particular, display upon starting up is mere suggestion of functions, so that whether such suggestion is necessary has no grounds.

Secondly, convenience of the suggestion is uncertain. When the display of functions is useful in a specific situation, operations such as clicking on a mouse, for example, are necessary in order to obtain the suggestion. Further, although the suggestion of functions is displayed, it is necessary to actually perform a displayed operation so as to accept the suggestion, so that users may feel that performing such an operation in accordance with instructions is inconvenient.

In order to overcome the above-mentioned problems, it is necessary to suggest necessary functions on the scene in accordance with a user situation. In addition, functions to be suggested preferably include those functions users are unaware of.

Some electronic program guides of TV programs gather not only information on personal preference but also information on preference of others (preference of other users in the same home, in particular) and recommend TV programs (refer to Patent Document 1, for example) to users.

Patent Document 1: U.S. patent application Ser. No. 09/966,414

However, information processing apparatuses such as computers generally pose a problem in that the same operations are repeatedly suggested from an operation history of a single user, for example.

SUMMARY

In an aspect of this disclosure, there is provided an information processing apparatus capable of suggesting file operations of which users are unaware based on an operation history of a similar file of other user without repeating the suggestion of the same operations, thereby suggesting various functions to users.

According to another aspect of this disclosure, there is provided an information processing apparatus comprising: a selection recognizing unit configured to recognize an electronic file being selected; a past history storing unit configured to store information on operations performed on an electronic file as past history information in association with information on the electronic file; a reference user selecting unit configured to select a user to refer to so as to select possible operations; and a possible selection suggesting unit configured to select, when the selection recognizing unit recognizes the electronic file being selected, possible operations on the selected electronic file from past operations on an electronic file with a high similarity to the selected electronic file in accordance with past history information on a user selected by the reference user selecting unit.

In the above-mentioned information processing apparatus, the possible operations on the selected electronic file are selected train the past history of operations on the similar electronic file of other user. Thus, even those operations not scored in the operation history of the user are suggested based on the operation history of other user.

According to another aspect of this disclosure, in addition to the above-mentioned structure, the apparatus includes an electronic file information obtaining unit configured to obtain and store information on the electronic file, wherein the possible selection suggesting unit calculates a degree of similarity between the selected electronic file and an electronic file of the past history information based on information stored in the electronic file information obtaining unit.

In the above-mentioned information processing apparatus, the degree of similarity is calculated based on information stored in the electronic file information obtaining unit.

According to another aspect of this disclosure, in addition to the above-mentioned structure, the apparatus includes a parameter storing unit configured to store, for each item of information on the electronic file stored in the electronic file information obtaining unit, significance of degree of similarity between the selected electronic file and the electronic file of the past history information.

In the above-mentioned in information processing apparatus, significance is provided to the degree of similarity calculated for each item of information on the electronic file and the degree of similarity of the electronic file is obtained. Thus, importance is set relative to the calculated degree of similarity.

According to another aspect of this disclosure, an addition to the above-mentioned structure, the electronic file information obtaining unit obtains and stores at least one item of information on an application using an electronic file, a name provided to the electronic file, creation daze and time of the electronic file, a name of a creator of the electronic file, and size of the electronic file.

In the above-mentioned information processing apparatus, the degree of similarity of the electronic file is calculated based on a combination of information using at least one item of information on the application using an electronic file, the name provided to the electronic file, the creation date and time of the electronic file, the name of a creator of the electronic file, and the size of the electronic file.

According to another aspect of this disclosure, in addition to the above-mentioned structure, the apparatus includes a profile storing unit configured to store information on a user, wherein the reference user selecting unit selects a user to refer to based on information stored in the profile storing unit.

In the above-mentioned information processing apparatus, a user to refer to is selected based on information stored in the profile storing unit.

According to another aspect of this disclosure, in addition to the above-mentioned structure, the profile storing unit stores at least one item of information on a unique user name, a name of an organization a user belongs to, a name of a device used by the user, and degree of experience of the user in device operations.

In the above-mentioned information processing apparatus, a user to refer to is selected based on a combination of information using at least one item of information on the unique user name, the organization name the user belongs to, the name of a device used by the user, and the degree of experience of the user in device operations.

According to another aspect of this disclosure, in addition to the above-mentioned structure, the apparatus includes a network interface for connecting to a network and controlling communication with other information processing apparatus art the network, wherein the possible selection suggesting unit refers to past history information regarding other information processing apparatus on the network.

In the above-mentioned information processing apparatus, past history information regarding ocher user of other information processing apparatus on the network is referred so as to select possible operations.

In the above-mentioned information processing apparatus, the possible selection suggesting unit selects possible operations on the selected electronic file from past operations on an electronic file with a high similarity to the selected electronic file in accordance with past history information regarding a user selected by the reference user selecting unit. Thus, it is possible to avoid repeatedly suggesting the same operations and suggest various types of functions.

Other aspects, features and advantage will become more apparent from the following detailed description when read in conjunction with the accompanying drawings.

BRIEF DESCRIPTION OF THE DRAWINGS

FIG. 4 is a diagram showing an example of a past history storing table;

FIG. 5 is a diagram showing an example of a parameter storing table;

FIG. 6 is a diagram showing an example of an electronic file information storing table;

FIG. 13 is a diagram showing an example of a profile storing table;

FIG. 14 is a diagram showing an example of a formula for calculating a value so as to select a reference user;

FIG. 15 is a diagram showing another example of a profile storing tablet;

DETAILED DESCRIPTION OF THE PREFERRED EMBODIMENTS

In the following, embodiments of the present invention will be described with reference to the accompanying drawings.

Figure 1:
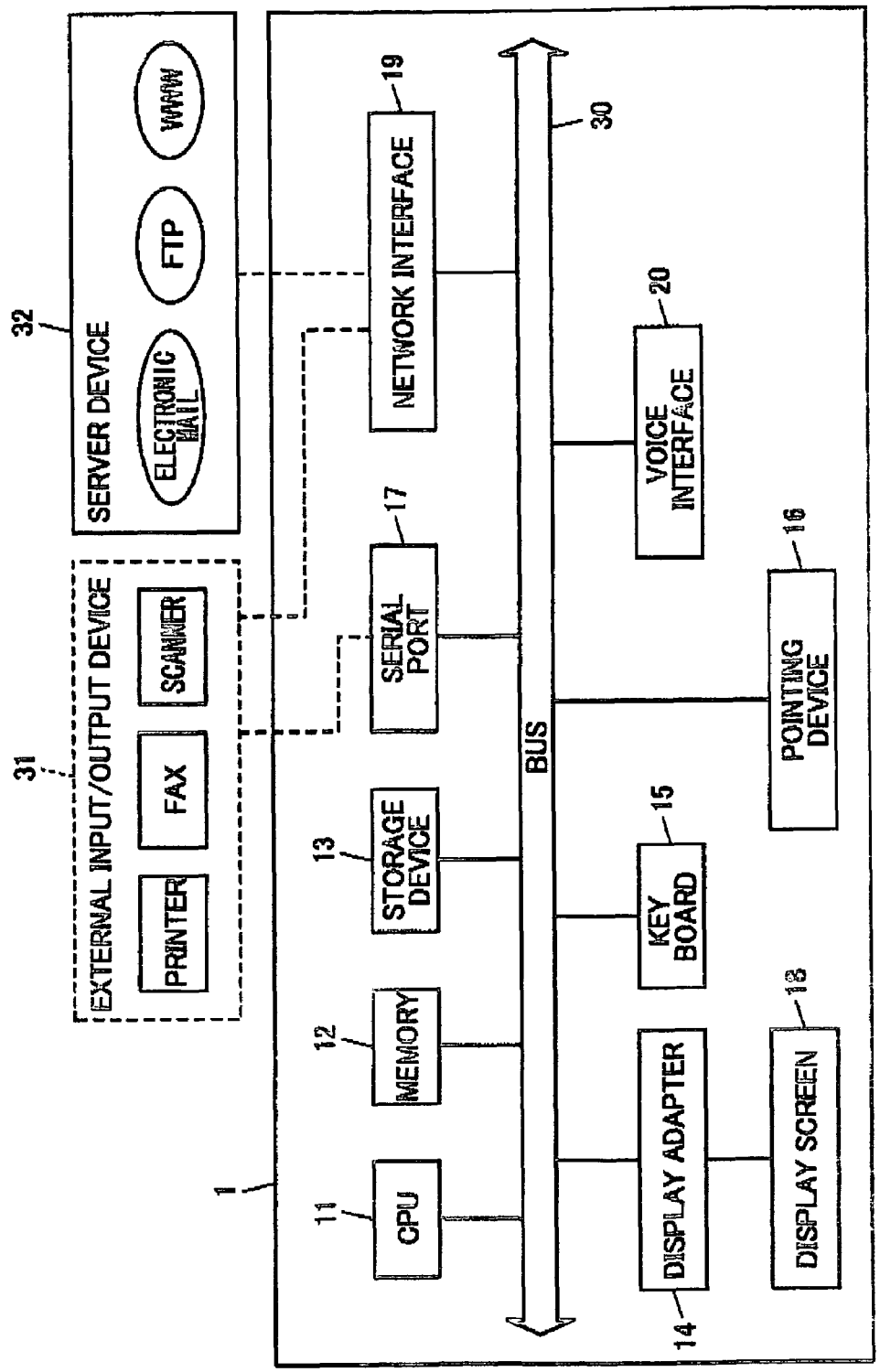
FIG. 1 is a block diagram showing a computer system according to a first embodiment of the present invention.

FIG. 1 is a block diagram showing a computer system according to a first embodiment of the present invention.

In FIG. 1, a computer system 1 according to the present embodiment includes a CPU (Central Processing Unit) 11, a memory 12, a storage device 13, a display adapter 14, a keyboard 15, a pointing device 16, and a serial port 17 in a connected manner via a bus 30.

The CPU 11 is for controlling each unit and performing predetermined operations in accordance with a program stored in the memory 12.

The memory 12 is for storing various types of information such as driving conditions of each unit, management data, and the like, and for storing data necessary for operations other than the program.

The storage device 13 is for storing programs, data necessary for the programs upon operation, a database, and the like.

The display adapter 14 is for displaying data on a display device such as a display screen 18.

The keyboard 15 is for allowing a user to input operation commands, orders, text data, and the like.

The pointing device 16 is for moving a pointer displayed on the display screen 18 and allowing the user to input operation commands, orders, and the like in accordance with a position of the pointer.

The serial port 17 is connected to an external input/output device 31 such as a printer, facsimile machine (FAX), scanner, and the like, and is used for controlling data input/output with the external input/output device 31.

On the bus 30, it is possible to connect various devices such as a network interface 19 connected to a network, the network interface 19 controlling communication with a device connected to the network, a voice interface 20 connected to a voice input/output device, the voice interface 20 controlling input/output of voice data, and the like.

For example, it is possible to use network services supplied from a server device 32, such as electronic mail, file transfer (FTP), WWW (World Wide Web), and the like via the network interface 19. It is also possible to use the external input/output device 31 such as a printer, facsimile machine, scanner, and the like connected to the network.

Figure 2:
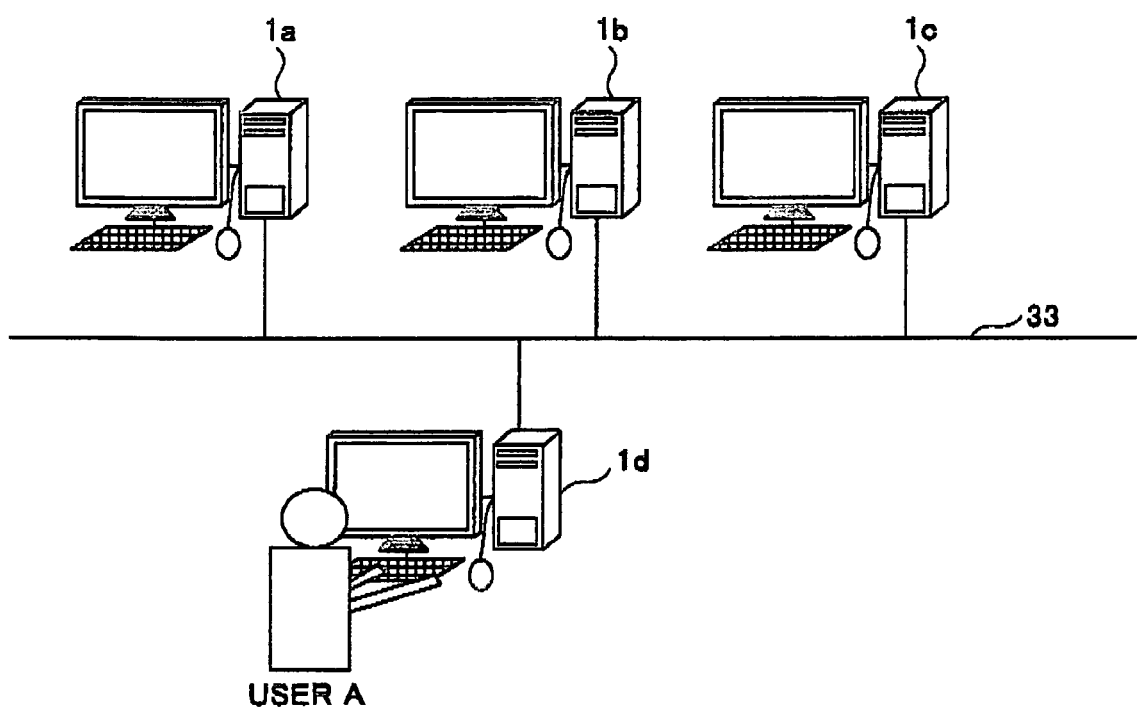
FIG. 2 is an illustration showing the computer system in use.

As shown in FIG. 2, the computer system 1 is realized using plural computer systems 1a to 1d connected to one another via a LAN (Local Area Network) 33. When a user (user A) of the computer system 1d tries to operate an electronic file on the computer system 1d, the computer system 1 refers to an operation history of other user in the computer system 1d and an operation history of other user in other computer system connected to the LAN 33. Then, the computer system 1 suggests possible operations on the electronic file based on the operation history of other user.

Figure 3:
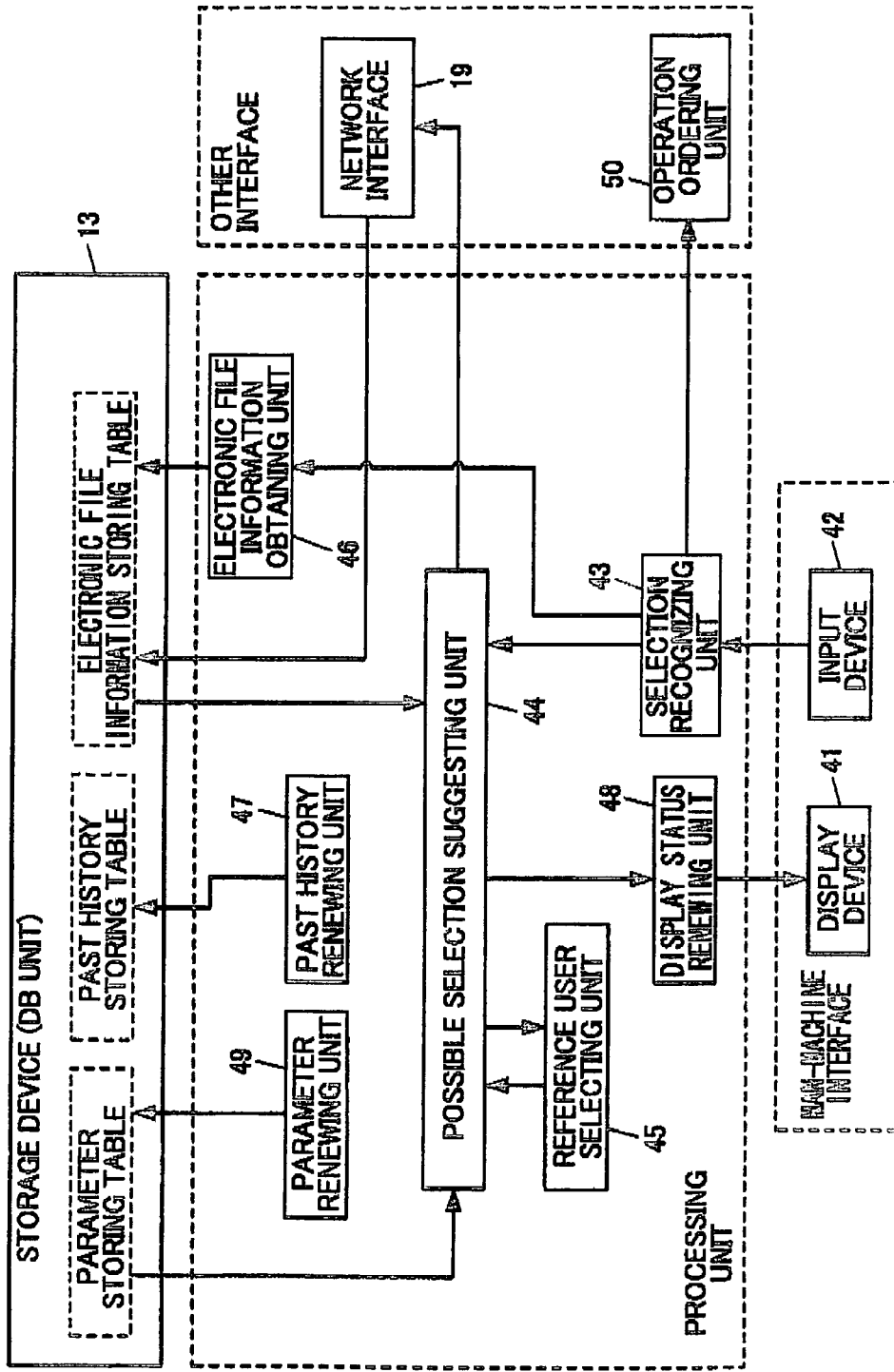
FIG. 3 is a functional block diagram of the computer system.

FIG. 3 is a block diagram of functions realized by the CPU 11 through a program. The same numerals as in FIG. 1 are assigned to the same configuration and description thereof is omitted.

In FIG. 3, the computer system 1 according to the present embodiment includes a display device 41 for suggesting information to the user such as the display screen 18, an input device 42 for allowing a user to input information such as the keyboard 15 and the pointing device 16, a selection recognizing unit 43 for determining whether the pointer on the display device 41 has selected an icon through an operation of the input device 42, a possible selection suggesting unit 44 suggesting possible operations on an electronic file corresponding to the icon selected using the pointing device 16, a reference user selecting unit 45 determining a user whose operation history is referred to upon selecting possible operations on the electronic file, an electronic file information obtaining unit 46 obtaining information on the electronic file corresponding to the icon selected using the pointing device 16, a past history renewing unit 47 storing description of operations performed on an electronic file as a past history in the storage device 13 together with information on the electronic file, a display status renewing unit 48 controlling a display of the display device 41, a parameter renewing unit 49 renewing parameters used upon selecting possible operations stored in the storage device 13, an operation ordering unit 50 ordering an operation corresponding to the selected operation, the storage device 13, and the network interface 19.

The storage device 13 includes a past history storing table for storing a history of past operations on an electronic file, a parameter storing table for storing parameters upon selecting possible operations on an electronic file, and an electronic file information storing table for storing information on an electronic file.

Examples of information on the electronic file include a name provided to the electronic file, an extension of the electronic file, an application associated with the electronic file, size of the electronic file, a creator of the electronic file, creation date and time of the electronic file, a folder where the electronic file is stored, and the like.

FIG. 4 is a diagram showing an example of the past history storing table.

A first column stores IDs of operated electronic files. A second column stores description of performed operations.

The past history storing table is provided with an additional row when each operation is completed.

FIG. 5 is a diagram showing an example of the parameter storing table.

A first row stores types of electronic file information used upon calculating similarity of electronic files. A second row stores significance corresponding to the types of electronic file information in the first row used upon calculating the similarity of electronic files.

Examples indicating the similarity of electronic files include matching/mismatching of extensions of electronic files, digitalized similarity of electronic file names, digitalized closeness of electronic file sizes, digitalized closeness of directories and computer systems where electronic files are stored, and the like.

FIG. 6 is a diagram showing an example of the electronic file information storing table.

A first column stores electronic file IDs. From a second column and later, information on electronic files corresponding to the electronic file IDs in the first column is stored.

The electronic file IDs in the first column are the same as the electronic file IDs in the first column of the past history storing table shown in FIG. 4.

The information on the electronic files correspond to information used to calculate a relationship among electronic files, the relationship being stored in the first row of the parameter storing table shown in FIG. 5.

In accordance with this, examples of information on the electronic files include extensions of electronic files, electronic file names, electronic file sizes, directories where electronic files are stored, device names where electronic files are stored, and the like used for calculating similarity between the electronic files based on the parameter storing table.

Figure 7:
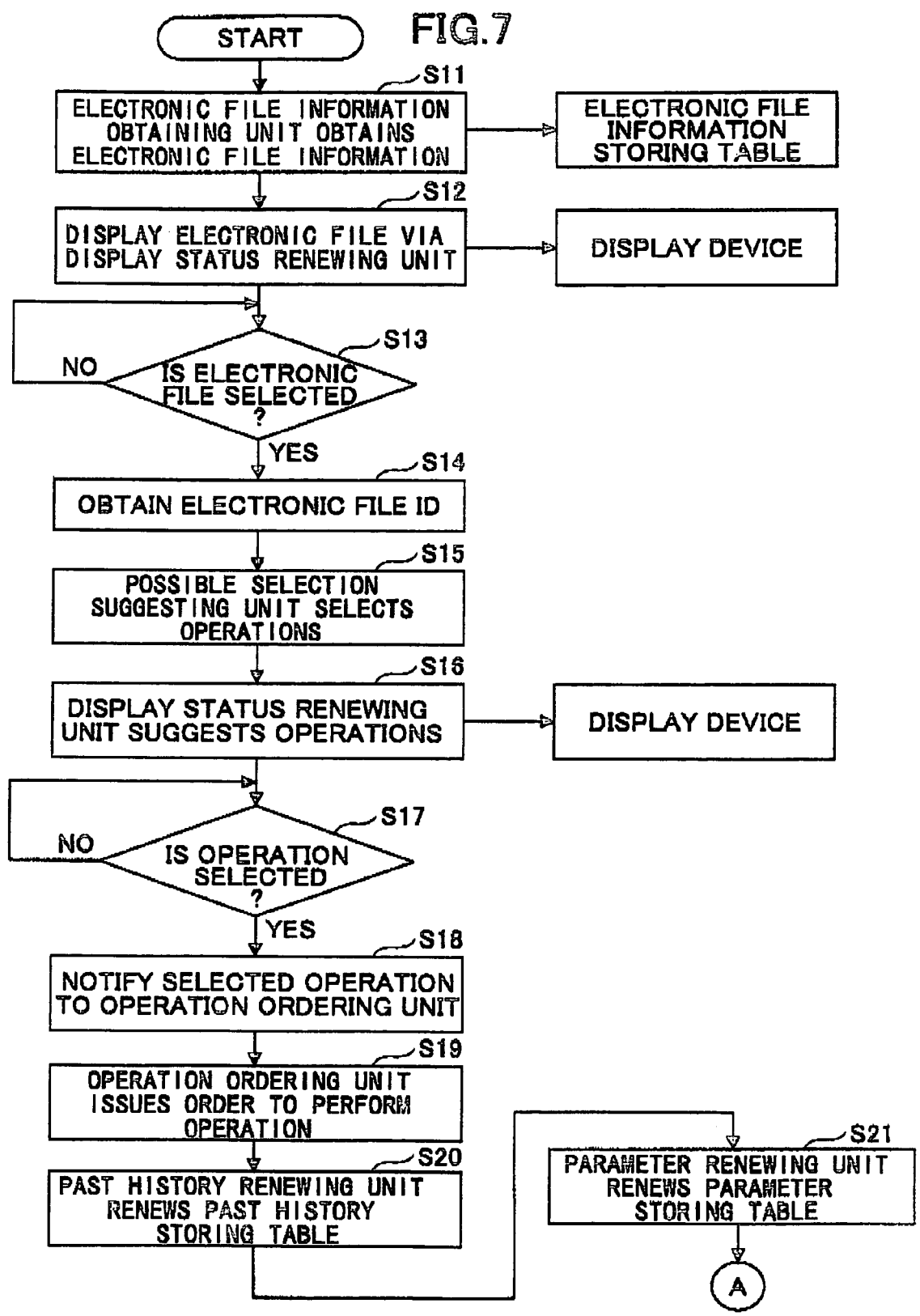
FIG. 7 is a first flowchart showing processing for suggesting possible operations on an electronic file.
Figure 8:
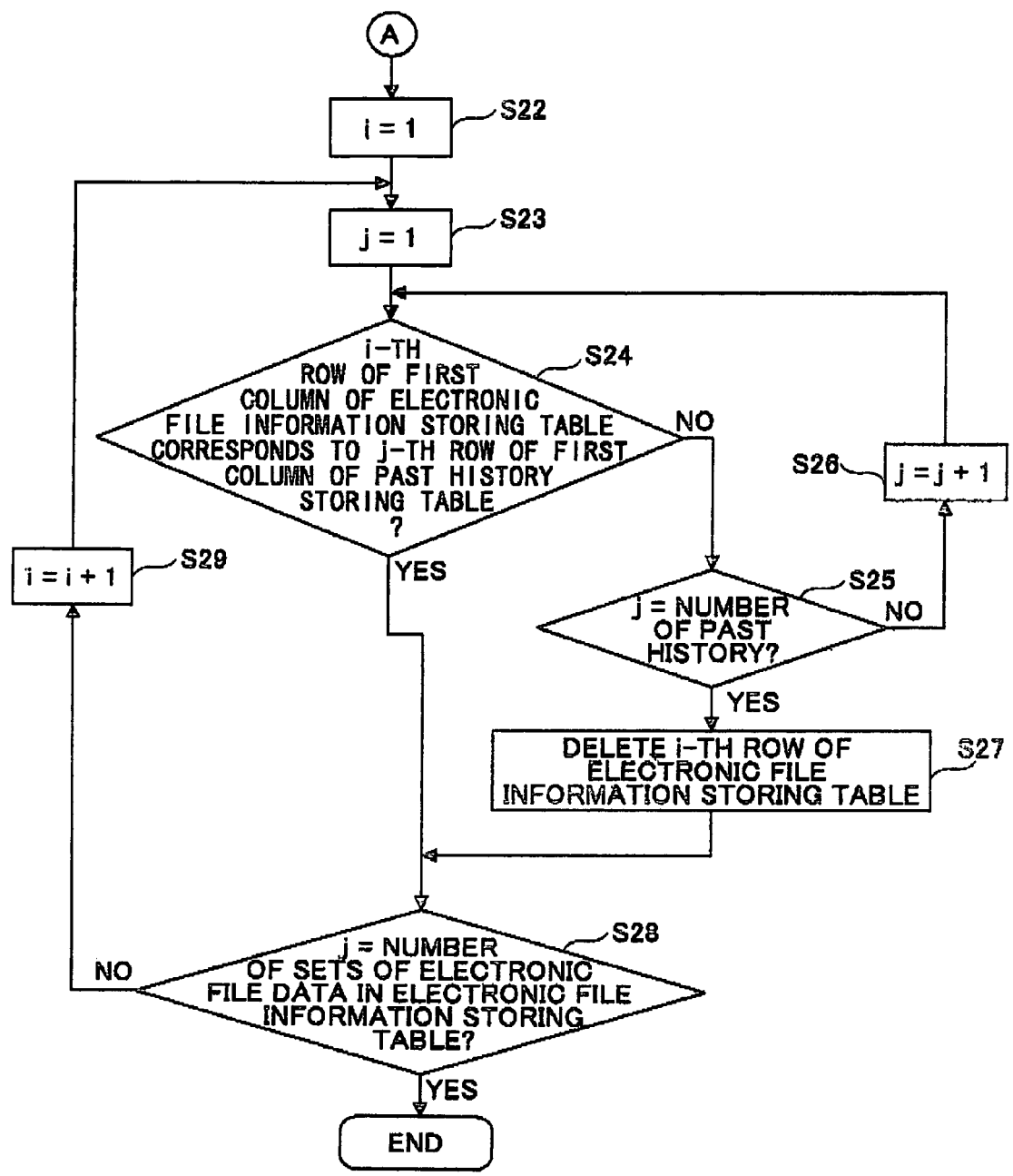
FIG. 8 is a second flowchart showing processing for suggesting possible operations on an electronic file.

FIGS. 7 and 8 are flowcharts showing an entire procedure of processing for suggesting possible operations on the electronic file in the computer system 1.

As shown in FIG. 7, first, the electronic file information obtaining unit 46 obtains information on at least one subject electronic file, stores the information in the electronic file information storing table, and provides an ID to each electronic file (S11).

Next, the display status renewing unit 48 causes the display device 41 to display icons indicating the electronic files (hereafter referred to as electronic file icons) (S12). For example, electronic files in a predetermined folder in the storage device 13 such as a hard disk are displayed.

Figure 9:
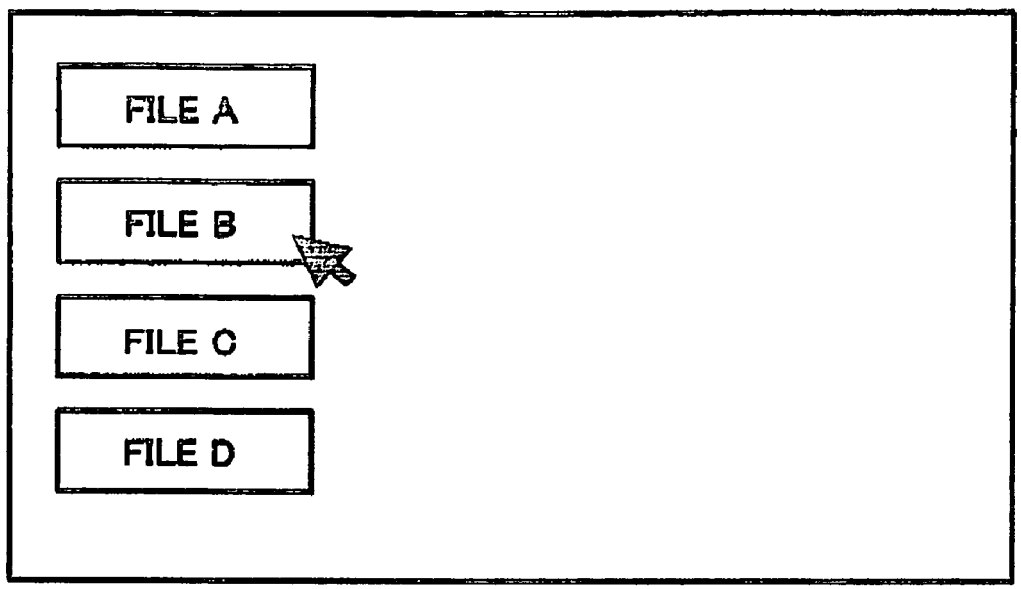
FIG. 9 is a diagram showing an example of display of electronic file icons.

The electronic file icons include buttons on which character strings indicating electronic file names are displayed, for example, as shown in FIG. 9.

Next, the selection recognizing unit 43 determines whether a particular electronic file icon on the display device 41 is selected through an operation of the input device 42 (S13). When the selection of the electronic file icon is detected, the electronic file information obtaining unit 46 obtains an electronic file ID (S14).

The selection of the electronic file is performed by pressing a mouse button or the like while the pointer displayed on the display device 41 is on the electronic file icon using the pointing device 16 such as a mouse, for example.

The selection recognizing unit 43 monitors coordinates of the pointer displayed on the display device 41. If the coordinates of the pointer, when a central button of a three-button mouse is pressed, for example, are within a range of the coordinates of the icon, the selection recognizing unit 43 determines that the icon is selected.

When an icon indicating a function is selected, description of the function is notified to the possible selection suggesting unit 44.

Figure 10:
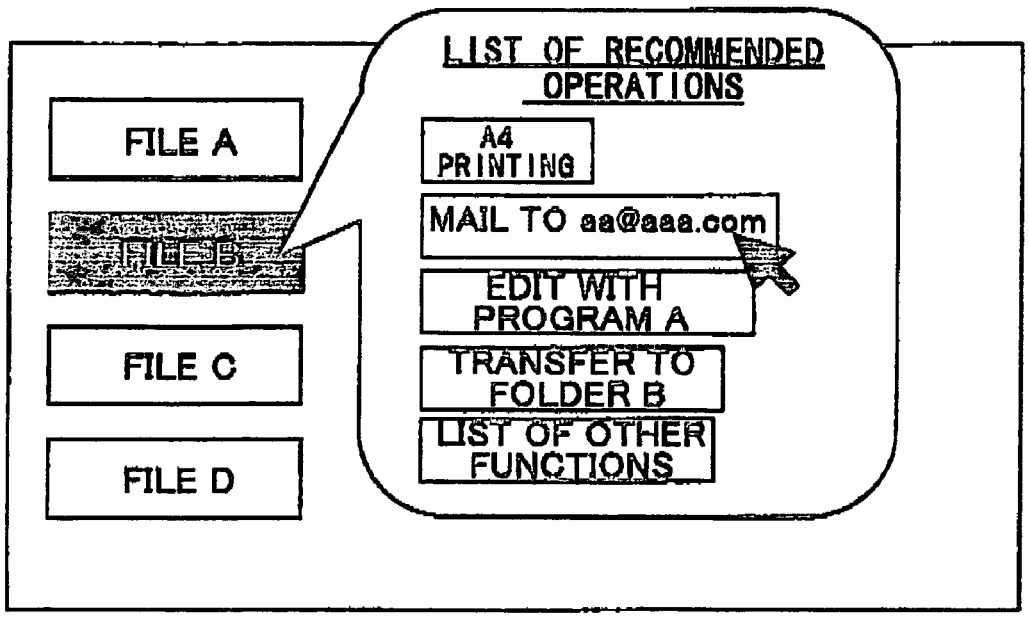
FIG. 10 is a diagram showing an example of a display of a list of possible operations.

Next, the possible selection suggesting unit 44 selects possible operations on the selected electronic file based on a past operation history of other user in the same group as that of the operating user (S15), and causes the display status renewing unit 48 to display a list of possible operations for the electronic file icon as shown in FIG. 10 (S16).

Figure 11:
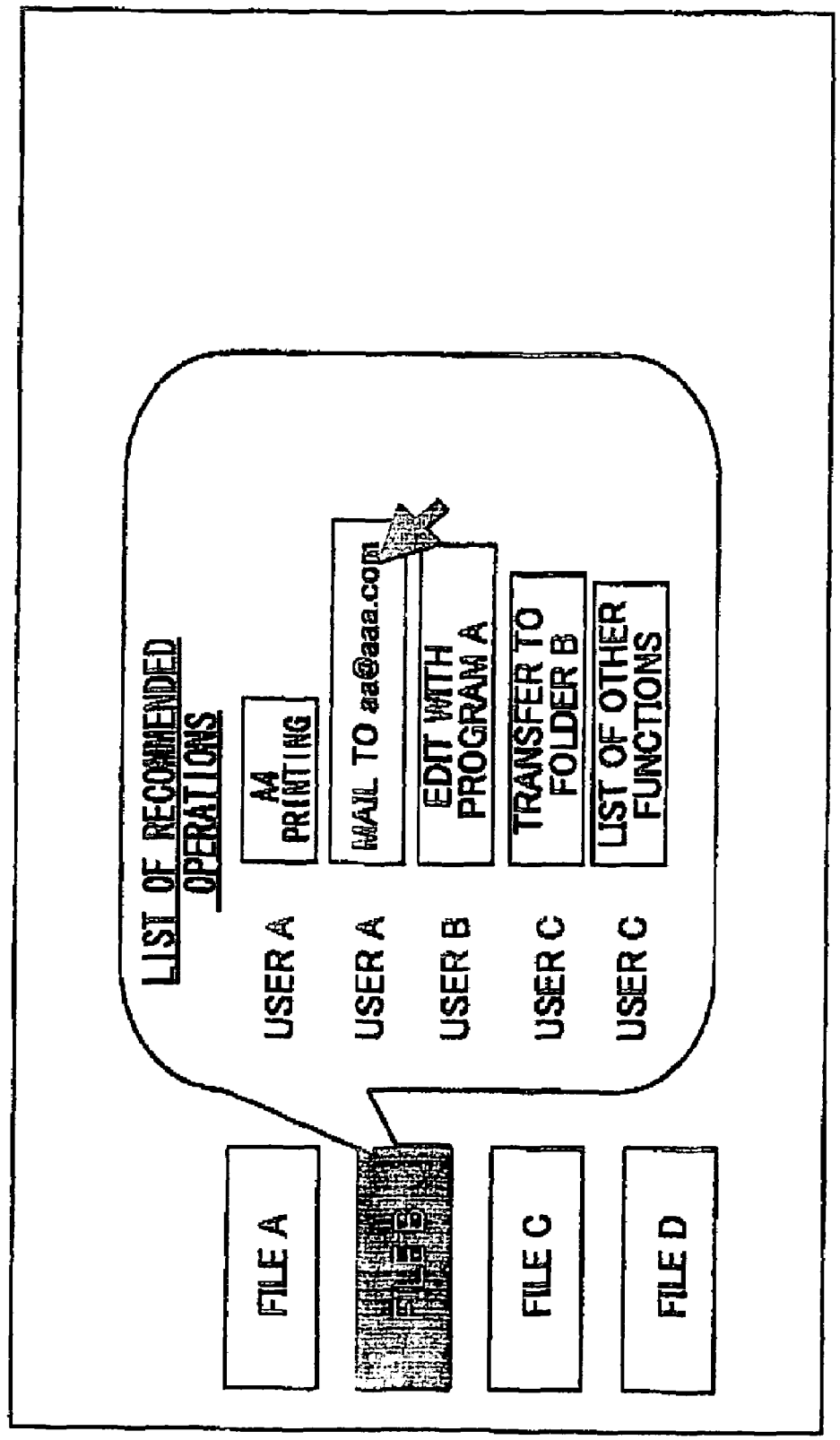
FIG. 11 is a diagram showing other example of a display of a list of possible operations.

The list of possible operations may be displayed with information on users referred to upon selecting the operations as shown in FIG. 11.

Examples of the same group include a collection of users physically belonging to the same group such as the same organization, the same room, the same building, and the like, a collection of users using the same type of devices for each computer system, a collection of users logging on the same network, and the like. Further, the same group may be a collection of any users determined in advance.

Next, the selection recognizing unit 43 determines whether an operation is selected through an operation of the input device 42 from the list of operations on the display device 41 (S17). When the selection of operation is detected, the selection recognizing unit 43 notifies description of the selected operation to the operation ordering unit 50 (S18). The operation ordering unit 50 issues an order to perform the notified operation on the electronic file selected by the user (S19).

In this case, the selection of operation is performed by clicking on one of the operations of the list of operations using a mouse, pressing cursor keys on a keyboard or hard buttons, touching a touch panel, or the like.

When the selected operation is performed, the past history renewing unit 47 renews the past history storing table (S20), and the parameter renewing unit 49 renews the parameter storing table (S21).

Then, the process progresses to the procedure of processing shown in FIG. 8. The process sets a loop variable "i" to 1 (S22) and a loop variable "j" to 1 (S23), and determines whether an i-th row of the first column of the electronic file information storing table corresponds to a j-th row of the first column of the past history storing table (S24). If correspondence is not found, whether j corresponds to the number of past history is determined (S25). If correspondence is not found, 1 is added to j (S26), and the process returns to S24 so as to determine correspondence between the electronic file information storing table and the past history storing table.

If j corresponds to the number of past history, the i-th row of the electronic file information storing table is deleted (S27).

If correspondence is found between the electronic file information storing table and the past history storing table as a result of the determination, the process determines whether i corresponds to the number of sets of electronic file data in the electronic file information storing table (S28). If correspondence is not found, 1 is added to i (S29) and the process returns to S23 so as to set j to 1 and the following processing is repeated. If i corresponds to the number of sets of the electronic file data in the electronic file information storing table, processing is ended and information corresponding to an electronic file that has not been stored in the past history storing table is deleted from electronic files stored in the electronic file information storing table.

Figure 12:
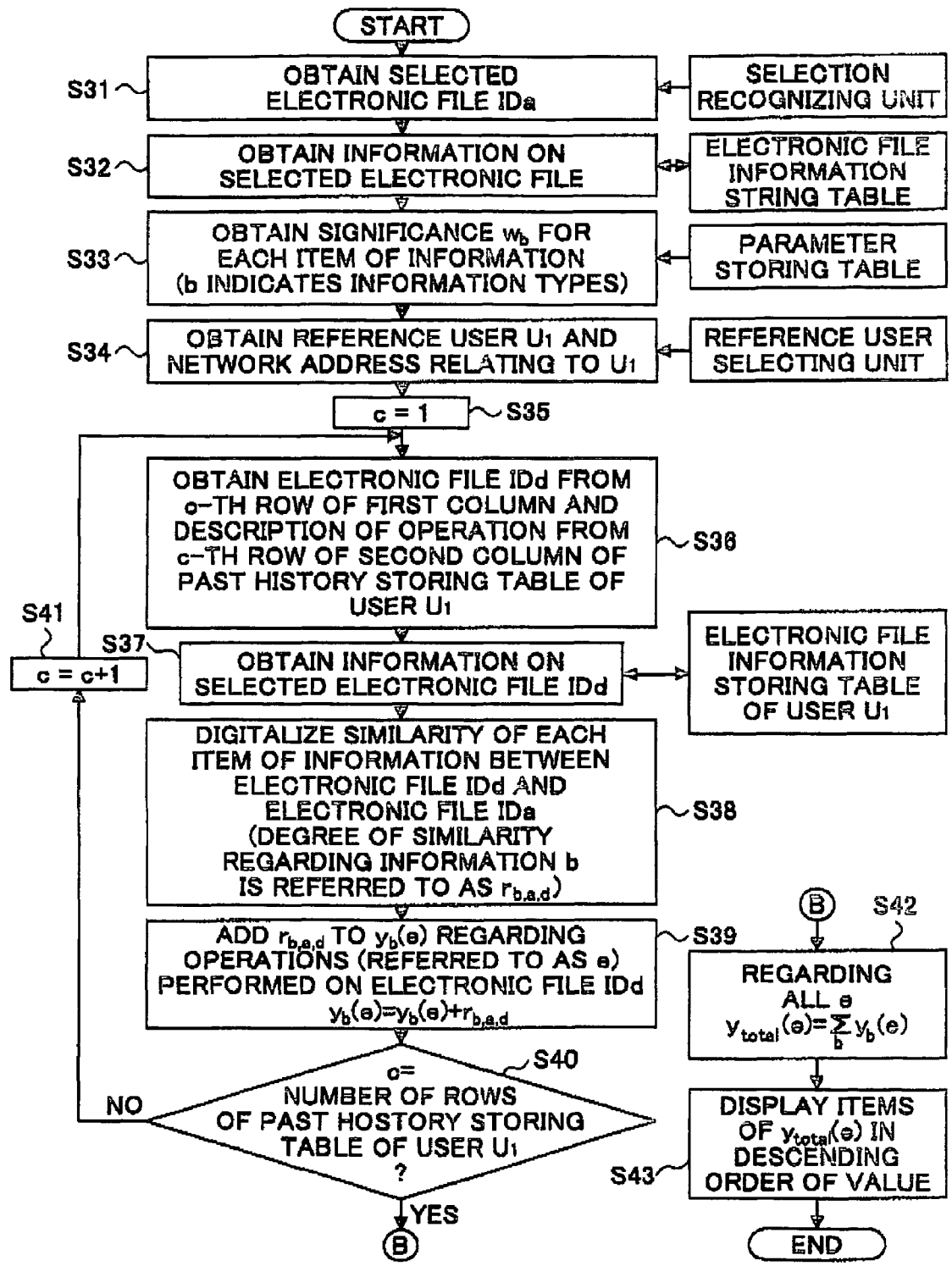
FIG. 12 is a flowchart showing processing of a possible selection suggesting unit.

FIG. 12 is a flowchart showing processing of the possible selection suggesting unit 44.

First, when the process obtains an electronic file ID (referred to as "a") from the selection recognizing unit 43 (S31), the process obtains electronic file information corresponding to the received electronic file IDa from the electronic file information storing table (S32).

The process also obtains a significance value $W_b$ for each type (referred to as "b") of electronic file information from the parameter storing table (S33).

The process obtains a user (referred to as $U_1$) whose operation history is referred to and network addresses where a past history storing table and an electronic file information storing table of the user are located (S34) via the reference user selecting unit 45, and the process sets a loop variable "c" to 1 (S35).

Next, the process obtains an electronic file ID (referred to as "d") from a c-th row of the first column and description of operation (referred to as "e") from the c-th row of a second column of the past history storing table (in the operating computer system or other device) of the user $U_1$ (S36) indicated by in the network address obtained in S34.

The process obtains electronic file information corresponding to the electronic file IDd from the electronic file information storing table (in the operating computer system or other device) of the user $U_1$ in the system indicated by the network address obtained in S34 (S37).

Regarding an electronic file having the electronic file IDa and an electronic file having the electronic file IDd, the process digitalizes similarity of each item of information set between the two electronic files (S38). A value obtained by digitalizing similarity of information b between sets of electronic file information of the electronic file IDa and IDb is referred to as $r_{b,a,d}$.

Specific example of digitalization is as follows. Concerning extensions of electronic files, 1 is set for correspondence and 0 is set for non-correspondence.

Concerning sizes of electronic files, a difference of values in which each value is obtained by dividing 1 by a file size is set (1 is set if there is no difference).

Concerning electronic file names, a value obtained by dividing the number of words used in common between two files by the number of total words is set. However, words not assumed to contribute the identity of a file name are excluded from both the number of total words and the number of common words.

Concerning directories where the electronic files are stored, a value obtained by dividing 1 by a distance to the directory is set. If both electronic files are stored in the same directory, 1 is set.

The distance to the directory refers to the number of going up or down required in a hierarchy in order to reach a destination directory from a certain directory. For example, the distance between files v and x stored in s¥t¥u¥v and s¥t¥w¥x, respectively, is four since four times of going up and down, namely, v-u-t-w-x is required in the hierarchy.

If there is $y_b(e)$ (in each type b of information) obtained by accumulating $r_{b,a,d}$ in each operation corresponding to description of operation performed on the electronic file IDd, calculated $r_{b,a,d}$ is added to $y_b(e)$. If there is no $y_b(e)$, the calculated $r_{b,a,d}$ is handled as a new $y_b(e)$ (S39).

Then, whether c corresponds to the number of rows of the past history storing table of the user $U_1$ is determined (S40). If c does not correspond to the number of rows, 1 is added to c (S41) and the process returns to S36 and then obtains an electronic file ID and description of operation in the next row.

If c corresponds to the number of rows of the past history storing table of the user $U_1$, a value of $y_{total}(e)$ obtained by summing up $y_b(e)$ in each type of information is calculated regarding all e (S42), and the display status renewing unit 48 displays items of $y_{total}(e)$ in descending order of value as possible operations (S43). The number of possible operations to be displayed is changed in accordance with the system.

When plural users are referred to, the processing performed on the user $U_1$ is performed on all users to be referred to and possible operations are set using values of $y_{total}(e)$ in descending order obtained in each user.

Further, from the past history storing table of each user, possible operations may be selected and suggested based on common descriptions of operation in descending order of appearance, the common descriptions of operation in ascending order of appearance, descriptions of operation that have not been listed in the past history storing table of the current user.

Next, processing of the reference user selecting unit is described.

The reference user selecting unit 45 refers to a profile storing table as shown in FIG. 13 and determines a reference user based on correspondence/non-correspondence between information from a second row or later and information on the current user.

As shown in FIG. 13, the profile storing table stores a personal name in a first column, organization name to which the person belongs to in a second column, device name in a third column, degree of experience in device operations in a fourth column, user-specific information such as a network address represented by an IP address, in which the past history storing table and the electronic file information storing table are located.

The degree of experience refers to a value indicating a level of proficiency in using a device. Examples of degree of experience include the number of types of operations the user performed in the past, a ratio of the number of types of operations the user performed in the past to the number of types of electronic files the user operated in the past, a period in which the user have used a device in the past, and the like.

Examples of a method of determining a reference user are based on the number of according columns in descending order, the number of non-according columns in ascending order, a user with a particular corresponding column, a user with a particular non-corresponding column, degree of experience in ascending order, and the like.

Further, on the basis of the parameter storing table, vectors may be made from a value $P_{i,1}$ in an i-th column of the parameter storing table stored for the operating user and from a value $P_{i,2}$ in an i-th column of parameter storing tables stored for the reference user. Then, a value of a formula shown in FIG. 14 may be calculated for each user and reference users may be selected in ascending order of calculated values.

Further, as shown in FIG. 15, the parameter storing table of the FIG. 13 may store a folder location in a sixth column, the folder location having the past history storing table and the electronic file information storing table in a network address stored in the fifth column. In accordance with this, reference to the past history storing table and the electronic file information storing table can be readily performed. The folder location may be represented by an absolute location (in the case of FIG. 15) in a system, a name of a shared folder, or a location in the shared folder, or the like.

Figure 16:
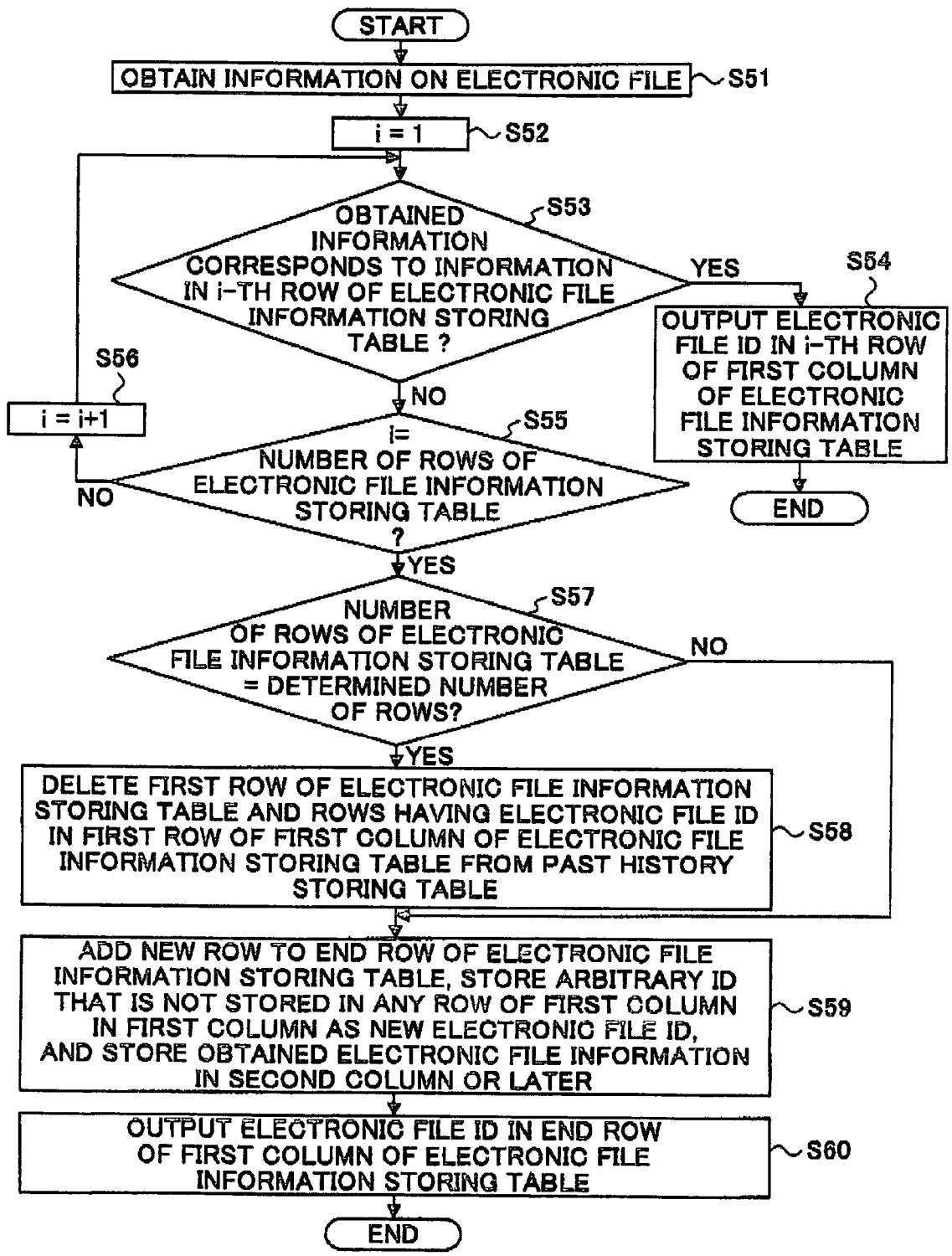
FIG. 16 is a flowchart showing processing of an electronic file information obtaining unit.

FIG. 16 is a flowchart showing processing of the electronic file information obtaining unit 46.

As shown in FIG. 16, the electronic file information obtaining unit 46 first obtains information on at least one electronic file regarding a subject electronic file (S51). Then, the electronic file information obtaining unit 46 sets the loop variable i to 1 (S52) and determines whether information from the i-th tow of the second column or later of the electronic file information storing table corresponds to the information obtained in S51 (S53).

If there is corresponding information, the process returns an electronic file ID stored in the i-th row of the first column of the electronic file information storing table (S54).

If there is no corresponding information, the process determines whether i corresponds to the number of rows of the electronic file information storing table (S55). If i does not correspond to the number of rows, the process adds 1 to i (S56) and returns to S53 to compare the obtained information with information stored in the next row.

If i corresponds to the number of rows of the electronic file information storing table, the process determines whether the number of rows of the electronic file information storing table corresponds to the number of rows determined by setting (S57). If the number of rows corresponds to the number of rows determined by setting, the process deletes the first row of the electronic file information storing table and all rows that have the same electronic file ID in the first row of the first column from the past history storing table (S58).

Then, the process adds a new row to the end row of the electronic file information storing table, generates an arbitrary ID that is not stored in the first column of other rows, and stores the generated ID in the first column of the new row as an electronic file ID and electronic file information in the second column or later (S59). Then, the process returns the electronic file ID stored in the end row of the first column of the electronic file information storing table (S60).

Figure 17:
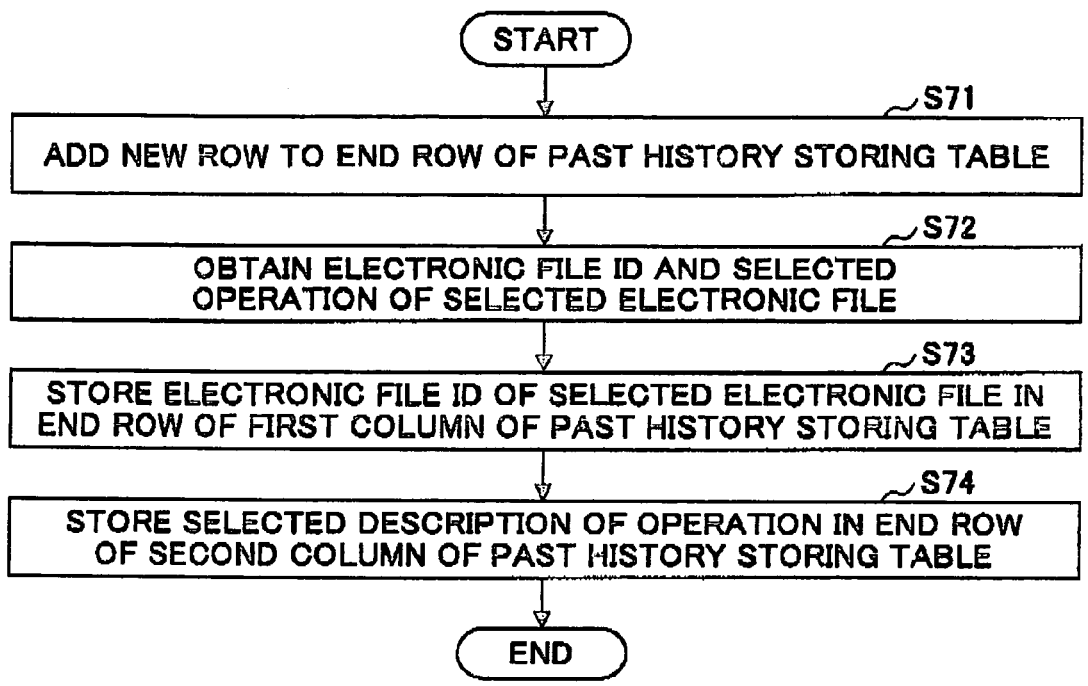
FIG. 17 is a flowchart showing processing of a past history renewing unit.

FIG. 17 is a flowchart showing processing of the past history renewing unit 47.

As shown in FIG. 17, the past history renewing unit 47 first adds a new row to the end row of the past history storing table (S71), obtains an electronic file ID and description of operation of a selected electronic file (S72), and stores the electronic file ID of the selected electronic file in the first column of the added row and the description of operation in the second column of the added row (S73).

Figure 18:
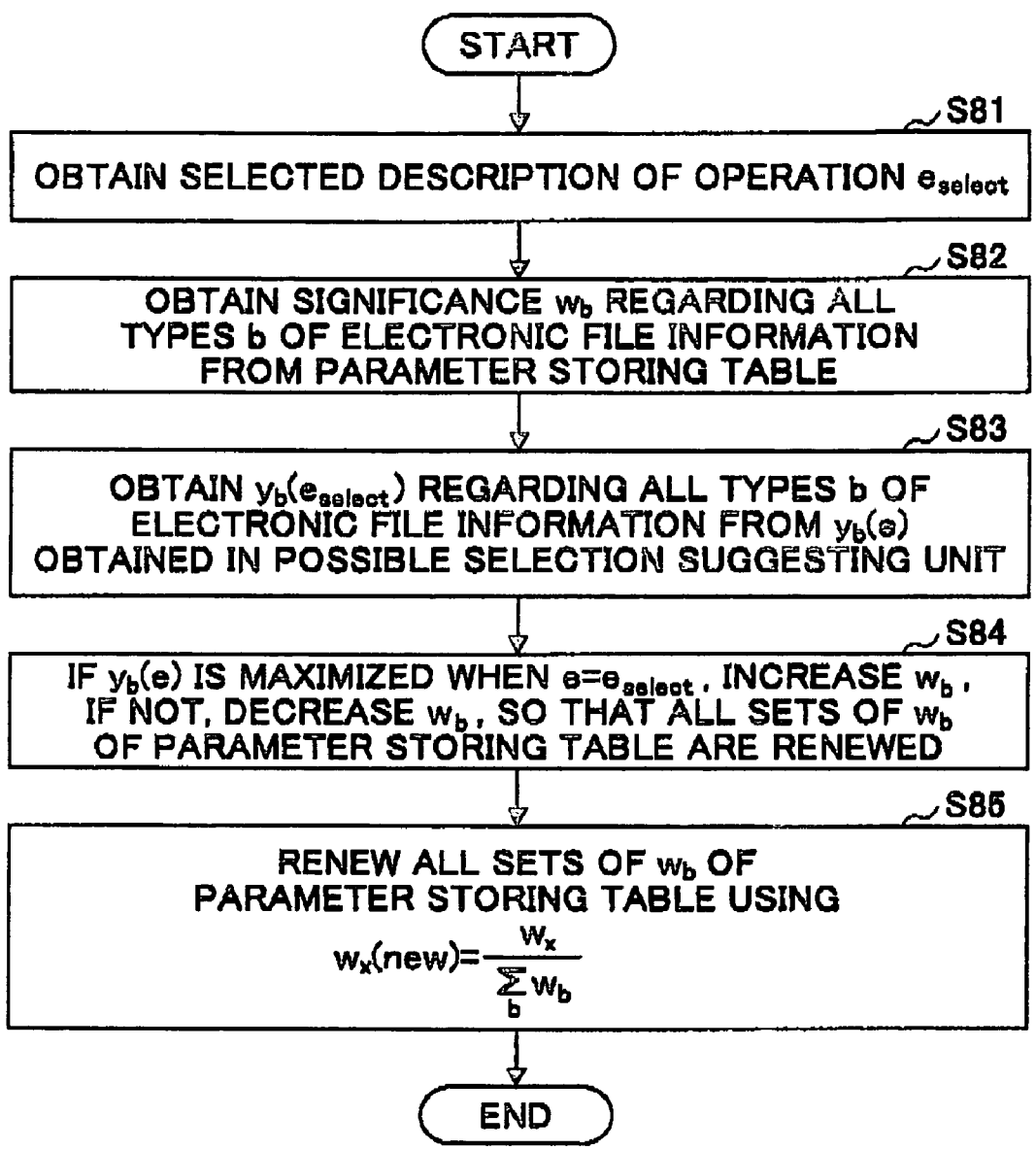
FIG. 18 is a flowchart showing processing of a parameter renewing unit.

FIG. 18 is a flowchart showing processing of the parameter renewing unit 49.

As shown in FIG. 18, the parameter renewing unit 49 first obtains selected description of operation (referred to as $e_{select}$) (S81), obtains significance $w_b$ regarding all types b of electronic file information from the parameter storing table (S82), and obtains $y_b(e)$ regarding all types b, the $y_b(e)$ being obtained by the possible selection suggesting unit 44 (S83).

If $y_b(e)$ is maximized when $e=e_{select}$ in each b, the process increases a value of $w_b$. If this is not the case, the process decreases the value of $w_b$, so that all sets of $w_b$ in the parameter storing table are renewed (S84).

Further, the process sets a new $w_b$ obtained by dividing the value of the renewed $w_b$ by a total sum of the sets of renewed $w_b$, so that the total sum of the sets of $w_b$ is 1 (S85).

In the following, an example of operation performed in the computer system 1d in an environment shown in FIG. 2 is described.

When the user A selects an electronic file icon displayed on the display device 41 of the computer system 1d by operating the input device 42, the selection recognizing unit 43 detects the selection, the electronic file information obtaining unit 46 obtains an electronic file ID from electronic file information on the selected electronic file icon and notifies the obtained electronic file ID to the possible selection suggesting unit 44.

The possible selection suggesting unit 44 causes the reference user selecting unit 45 to select a reference user, obtains the electronic file information storing table, past history storing table, and parameter storing table via the LAN 33, the three tables being stored in a computer system for the selected user. Then the possible selection suggesting unit 44 compares the obtained information with electronic file information on the selected electronic file stored in the storage device 13, selects operations to be recommended, and displays the operations on the display device 41 via the display status renewing unit 48.

When the user A selects one of the displayed operations using the input device 42, the selection recognizing unit 43 detects the selection, and notifies description of the selected operation to the operation ordering unit 50. The operation ordering unit 50 issues an order to perform the selected operation.

When the performance of the selected operation is ended, the past history renewing unit 47 renews the past history storing table of the computer system 1d operated by the user A, and the parameter renewing unit 49 renews the parameter storing table of the computer system 1d operated by the user A.

In this manner, according to the present embodiment, the possible selection suggesting unit 44 selects and suggests operations frequently performed on a similar file as possible operations on the selected electronic file from the operation history of other user instead of the operating user, so that it is possible to avoid repeatedly suggesting the same operations from the operation history of a single user and to suggest various types of operations including those operations from the operation history of other user.

Further, the possible selection suggesting unit 44 suggests operations frequently performed on an electronic file having higher similarity to a selected electronic file, it is possible to suggest functions likely to be useful for an electronic file that has never been used in the past, based on the operation history of other user.

Moreover, as a method of selecting a reference user, it is possible to find functions yet to be known by setting such that a user with a different tendency is selected.

When an operation on an electronic file is selected, the operation ordering unit 50 issues an order to perform the selected operation, so that it is possible to eliminate the trouble of performing the operation by merely selecting the operation.

In the present embodiment, when an electronic file icon is selected using the pointing device 16, an operation is selected and suggested. However, when the electronic file icon is dragged and dropped on an icon, corresponding to a function and suggesting an operation, the operation on an electronic file corresponding to the electronic file icon may be selected. Also, while the electronic file icon displayed on the display device 41 is selected using a hard button, an operation may be selected when a hard key corresponding to a function suggesting the operation is pressed. Further, while an electronic file is used in an application, an operation may be selected when a hard key corresponding to a function suggesting the operation is pressed or when a figure corresponding to the function suggesting the operation on the display device 41 is selected using the pointing device 16 or the like.

In the present system, although the electronic file information storing table and the past history storing table are managed in a system of each user, the tables may be collectively held in a specific server. In this case, the system of each user holds a network address of the server and data reference and renewal is performed on the server.

Figure 19:
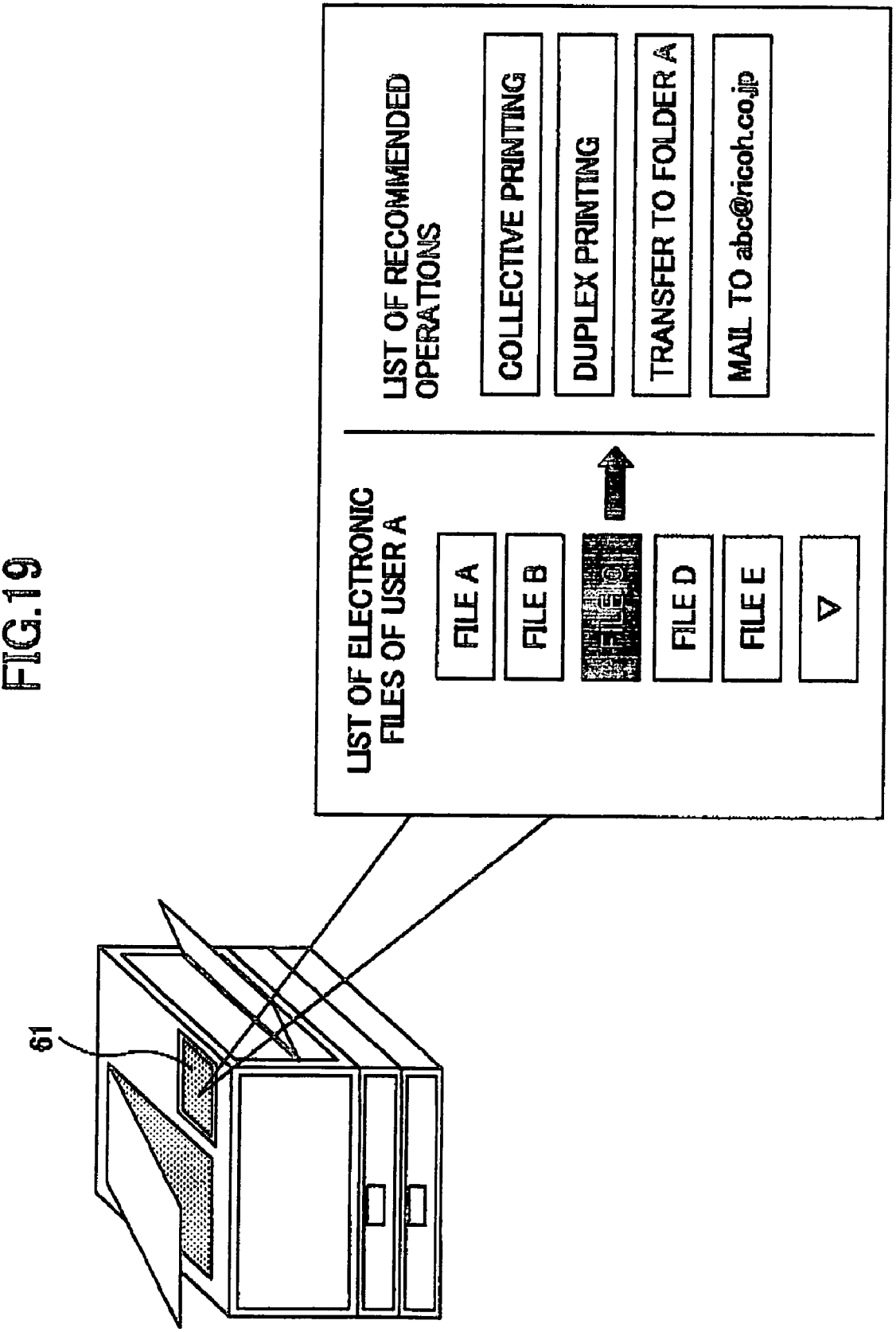
FIG. 19 is an appearance diagram showing a printer apparatus according to a second embodiment of the present invention.

FIG. 19 is an appearance diagram showing a printer apparatus according to a second embodiment of the present invention. In the apparatus, it is possible to perform operations of printing, mail transmission, and the like regarding an electronic file held in the apparatus. In addition, a block configuration of functions of the present embodiment is constructed in substantially the same manner as in the above-mentioned first embodiment, so that only those features characteristic of the present embodiment are described with reference to FIG. 3.

A printer apparatus according to the present embodiment includes a touch panel 61 as an element functioning as both the display device 41 and the input device 42. The printer apparatus identifies plural users based on user IDs and passwords input from the touch panel 61 and stores electronic files that have been used, a past history, and parameters regarding each user. In other words, the past history storing table, parameter storing table, and electronic file information storing table are stored for each user and information on other user is referred to as reference user information in the apparatus without using the network interface 19.

As shown in FIG. 19, a list of electronic files possessed by a user is displayed on a left side of the touch panel 61, the user being identified through ID input. The selection recognizing unit 43 detects an electronic file being selected by pressing on a display of the touch panel 61. And the possible selection suggesting unit 44 displays operations on the selected electronic file on a right side of the touch panel 61 via the display status renewing unit 48, the operations being selected based on a user history of other user of the printer apparatus.

In the present apparatus, examples of time when the operation suggestion is performed include a time when the ID is input, a time when the electronic file is requested by the user from the printer apparatus by pressing a button, and the like.

Figure 20:
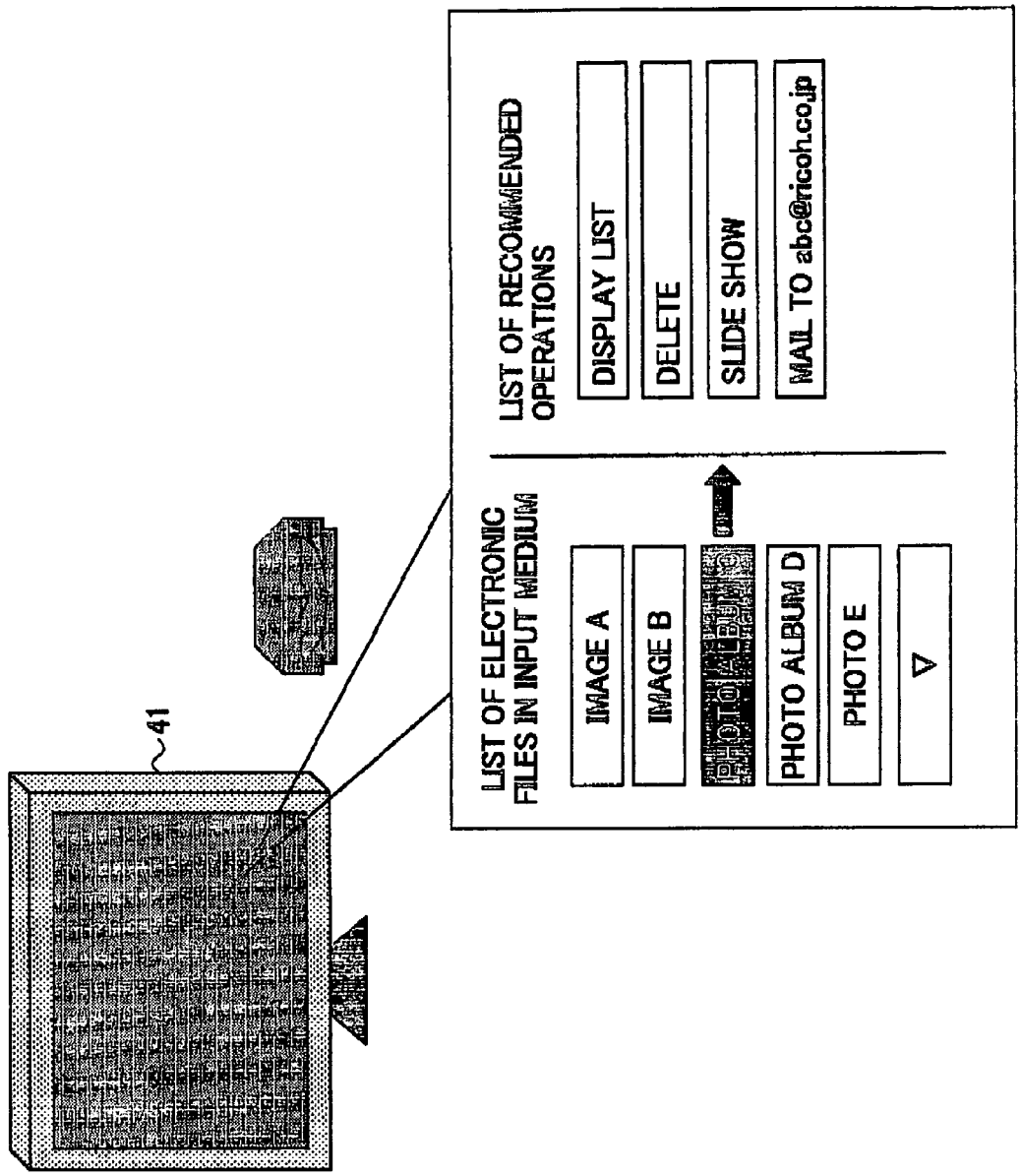
FIG. 20 is an appearance diagram showing a media reproducing apparatus according to a third embodiment of the present invention.

Next, FIG. 20 is an appearance diagram showing a media reproducing apparatus according to a third embodiment of the present invention. In the apparatus, it is possible to display and reproduce electronic files such as videos and images stored in a medium and transmit such materials via a network. In addition, a block configuration of functions of the present embodiment is constructed in substantially the same manner as in the above-mentioned first embodiment, so that only those features characteristic of the present embodiment are described with reference to FIG. 3.

A medium reproducing apparatus according to the present embodiment identifies plural users based on user IDs and passwords input from the input device 42 and stores electronic files that have been used, a past history, and parameters regarding each user. In other words, the past history storing table, parameter storing table, and electronic file information storing table are stored for each user. And information on other user in the apparatus is referred to along with information on a user of other medium reproducing apparatus via the network interface 19 as reference user information.

As shown in FIG. 20, a list of electronic files possessed by a user is displayed on a left side of the display device 41, the user being identified through ID input. The selection recognizing unit 43 detects an electronic file being selected by operating the input device 42. And the possible selection suggesting unit 44 displays operations on the selected electronic file on a right side of the display device 41 via the display status renewing unit 48, the operations being selected based on a user history of other user of the medium reproducing apparatus and a user history of other user of other medium reproducing apparatus obtained via the network interface 19.

Operations may be estimated by referring to an operation history of other medium reproducing apparatus while handling an ID of the reproducing apparatus as a user ID without identifying users in the same device.

Further, examples of time when suggestion according to the apparatus is made include a time when a medium is inserted, a time when a user requests an operational suggestion by pressing a button, and the like.

The present invention is not limited to the specifically disclosed embodiment, and variations and modifications may be made without departing from the scope of the present invention.

The present application is based on Japanese priority application No. 2005-241101 filed Aug. 23, 2005 and Japanese priority application No. 2006-212357 filed Aug. 3, 2006 the entire contents of which are hereby incorporated herein by reference.

What is claimed is:

1. An information processing apparatus connected via a network to another information processing apparatus, the information processing apparatus comprising:

a storing device configured to store an electronic file information storing table for storing first information regarding one or more electronic files and a past history storing table for storing second information indicating operations performed on the one or more electronic files;

a processing unit configured through one or more programs of instructions to include:

a selection recognizing unit configured to receive a selection of an electronic file by a first user;

a reference user selecting unit configured to receive a selection of a second user to be referenced in a past history storing table in said another information processing apparatus, the selected second user being a user other than the first user who selected the electronic file;

an electronic file information obtaining unit configured to obtain, from the electronic file information storing table, the first information regarding the selected electronic file, the selection of which was received by the selection recognizing unit; and a possible selection suggesting unit configured to calculate a degree of similarity between the selected electronic file selected by the first user and another electronic file for which additional information is stored in an electronic file information storing table in said another information processing apparatus, said another electronic file having been used by the selected second user, the calculation being based on the first information regarding the selected electronic file and the additional information regarding said another electronic file, and said possible selection suggesting unit determining one or more possible operations to perform to the selected electronic file selected by the first user, based on operations information indicating operations performed on said another electronic file with a high degree of calculated similarity, the operations information having been obtained from the past history storing table in said another information processing apparatus used by the selected second user; and a displaying device configured to display the one or more possible operations, determined by said possible selection suggesting unit, as available selections of operations to perform on said another electronic file by the possible selection suggesting unit.

2. The information processing apparatus according to claim 1, wherein the storing device further stores a parameter storing table for storing significance information regarding the one or more electronic files, and wherein the possible selection suggesting unit obtains the significance information for the selected electronic file from the parameter storing table based on the first information regarding the selected electronic file obtained by the electronic file information obtaining unit from the electronic file information storing table, calculates the degree of similarity between the selected electronic file and said another electronic file for which the additional information is stored in the electronic file information storing table in said another information processing apparatus, based on the first information regarding the selected electronic file, the additional information regarding said another electronic file, and the significance information regarding the selected electronic file obtained from the parameter storing table, obtains, from the past history storing table in said another information processing apparatus used by the selected second user selected in the reference user selecting unit, the operations information indicating the operations performed on said another electronic file with the high degree of calculated similarity, and suggests the one or more possible operations as available selections, displayed on the display device, of operations to perform on said another electronic file.

3. The information processing apparatus according to claim 1, wherein the electronic file information obtaining unit obtains and stores at least one item of information regarding an application using the selected electronic file, a name provided to the selected electronic file, creation date and time of the selected electronic file, a name of a creator of the selected electronic file, and size of the selected electronic file.

4. The information processing apparatus according to claim 1, further including:

a profile storing unit configured to store profile information regarding the second user, wherein the reference user selecting unit selects the second user with reference to the profile information stored in the profile storing unit.

5. The information processing apparatus according to claim 4, wherein the profile storing unit stores at least one item of information regarding a unique user name, a name of an organization to which the user belongs, a name of a device used by the user, and degree of experience of the user in device operations.

6. The information processing apparatus according to claim 1, further including:

a network interface for connecting to the network and controlling communication with said another information processing apparatus on the network, wherein the possible selection suggesting unit refers to past history information regarding said another information processing apparatus on the network.

7. The information processing apparatus according to claim 1, wherein the information processing apparatus includes a personal computer.

8. The information processing apparatus according to claim 1, wherein the information processing apparatus includes a printer apparatus.

9. The information processing apparatus according to claim 1, wherein the information processing apparatus includes a medium reproducing apparatus.

10. A computer-readable medium embodying a program of instructions executable by a computer including a storing unit, and when executed by the computer, causes the computer to perform functions comprising:

a selection recognizing unit configured to receive a selection of an electronic file by a first user;

an electronic file information obtaining unit configured to obtain, from an electronic file information storing table in the storage unit of the computer, first information regarding the selected electronic file, the selection of which was received by the selection recognizing unit;

a reference user selecting unit configured to receive a selection of a second user to be referenced in a past history storing table in another information processing apparatus, the selected second user being a user other than the first user who selected the electronic file;

a possible selection suggesting unit configured to calculate a degree of similarity between the selected electronic file selected by the first user and another electronic file for which additional information is stored in an electronic file information storing table in said another information processing apparatus, said another electronic file having been used by the selected second user, the calculation being based on the first information regarding the selected electronic file and the additional information regarding said another electronic file, and said possible selection suggesting unit determining one or more possible operations to perform to the selected electronic file selected by the first user, based on operations information indicating operations performed on said another electronic file with a high degree of calculated similarity, the operations information having been obtained from the past history storing table in said another information processing apparatus used by the selected second user; and a displaying unit configured to display the one or more possible operations, determined by said possible selection suggesting unit, as available selections of operations to perform on said another electronic file by the possible selection suggesting unit.

11. The computer-readable medium according to claim 10, wherein the storing unit further stores a parameter storing table for storing significance information regarding the one or more electronic files, and wherein the possible selection suggesting unit obtains the significance information for the selected electronic file from the parameter storing table based on the first information regarding the selected electronic file obtained by the electronic file information obtaining unit from the electronic file information storing table, and calculates the degree of similarity between the selected electronic file and said another electronic file for which the additional information is stored in the electronic file information storing table in said another information processing apparatus, based on the first information regarding the selected electronic file, the additional information regarding said another electronic file, and the significance information regarding the selected electronic file obtained from the parameter storing table.

12. The computer-readable medium according to claim 10, wherein said functions further include:

a parameter storing unit configured to store, for each item of information regarding the selected electronic file stored in the storing unit, significance of degree of similarity between the selected electronic file and the additional electronic file.

13. The computer-readable medium according to claim 10, wherein the electronic file information obtaining unit obtains and stores at least one item of information regarding an application using the selected electronic file, a name provided to the selected electronic file, creation date and time of the selected electronic file, a name of a creator of the selected electronic file, and size of the selected electronic file.

14. The computer-readable medium according to claim 10, wherein said functions further include:

a profile storing unit configured to store profile information regarding the second user, wherein the reference user selecting unit selects the second user with reference to the profile information stored in the profile storing unit.

15. The computer-readable medium according to claim 14, wherein the profile storing unit stores at least one item of information regarding a unique user name, a name of an organization to which the user belongs, a name of a device used by the user, and degree of experience of the user in device operations.

16. The computer-readable medium according to claim 10, wherein said computer includes a network interface for connecting to a network and controlling communication with said another information processing apparatus on the network, wherein the possible selection suggesting unit refers to past history information regarding said another information processing apparatus on the network.

17. A method for guiding user operations on an information processing apparatus connected via a network to another information processing apparatus, the method comprising:

(a) storing an electronic file information storing table for storing first information regarding one or more electronic files and a past history storing table for storing second information indicating operations performed on the one or more electronic files, in a storage device of the information processing apparatus;

(b) receiving a selection of an electronic file by a first user;

(c) receiving a selection of a second user to be referenced in a past history storing table in a storage device of said another information processing apparatus, the selected second user being a user other than the first user who selected the electronic file;

(d) obtaining, by a processing device or the information processing apparatus, from the electronic file information storing table in the storage device of the information processing apparatus, the first information regarding the selected electronic file;

(e) calculating, by the processing device of the information processing apparatus, a degree of similarity between the selected electronic file selected by the first user and another electronic file for which information is stored in an electronic file information storing table in the storage device of said another information processing apparatus, said another electronic file having been used by the selected second user, the calculation being based on the first information regarding the selected electronic file and the additional information regarding said another electronic file;

(f) determining one or more possible operations to perform to the selected electronic file selected by the first user, based on operations information indicating operations performed on said another electronic file with a high degree of calculated similarity, the operations information having been obtained from the past history storing table in the storage device of said another information processing apparatus used by the selected second user; and (g) displaying on a display device of the image processing apparatus the one or more possible operations as available selections of operations to perform on said another electronic file.

18. The method of claim 17 further comprising:

storing, in a parameter storing table, significance information regarding the one or more electronic files; and obtaining the significance information for the selected electronic file from the parameter storing table based on the first information regarding the selected electronic file obtained front the electronic file information storing table, wherein the degree of similarity between the selected electronic file and said another electronic file, for which the additional information is stored in the electronic file information storing table in said another information processing apparatus, is calculated in (e) based on the first information regarding the selected electronic file, the additional information regarding said another electronic file, and the significance information regarding the selected electronic file obtained from the parameter storing table.

19. The method of claim 17, further comprising:

obtaining and storing at least one item of information regarding an application using the selected electronic file, a name provided to the selected electronic file, creation date and time of the selected electronic file, a name of a creator of the selected electronic file, and size of the selected electronic file.

20. The method of claim 17, further comprising:

storing profile information regarding the selected second user, in a profile storing unit, wherein the second user is selected with reference to the profile information stored in the profile storing unit.

21. The method of claim 20, wherein storing in the profile storing unit at least one item of information regarding a unique user name, a name of an organization to which the user belongs, a name of a device used by the user, and degree of experience of the user in device operations.

22. The method of claim 17, further comprising:

utilizing a network interface to connect to a network and control communication with said another information processing apparatus on the network, wherein the degree of similarity between the selected electronic file and said another electronic file is determined in (e) with reference to past history information regarding said another information processing apparatus on the network.

* * * * *